(12) United States Patent
Keiser et al.

(10) Patent No.: US 9,866,607 B2
(45) Date of Patent: *Jan. 9, 2018

(54) DISTRIBUTION OF BROADCAST CONTENT TO CONTROLLED-ENVIRONMENT FACILITIES

(71) Applicant: Securus Technologies, Inc., Dallas, TX (US)

(72) Inventors: Luke Keiser, Frisco, TX (US); Scott Passe, Forney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,568

(22) Filed: Apr. 30, 2016

(65) Prior Publication Data
US 2016/0301728 A1 Oct. 13, 2016

Related U.S. Application Data

(63) Continuation of application No. 13/253,101, filed on Oct. 5, 2011, now Pat. No. 9,332,014.

(60) Provisional application No. 61/472,187, filed on Apr. 5, 2011.

(51) Int. Cl.
| | |
|---|---|
| H04L 29/06 | (2006.01) |
| H04W 4/00 | (2009.01) |
| H04L 29/08 | (2006.01) |
| H04L 29/12 | (2006.01) |
| H04L 12/931 | (2013.01) |

(52) U.S. Cl.
CPC .......... *H04L 65/601* (2013.01); *H04L 49/602* (2013.01); *H04L 61/2007* (2013.01); *H04L 63/0876* (2013.01); *H04L 63/107* (2013.01); *H04L 63/108* (2013.01); *H04L 65/4076* (2013.01); *H04L 67/02* (2013.01); *H04W 4/008* (2013.01); *H04L 63/306* (2013.01)

(58) Field of Classification Search
CPC .. H04L 63/0876; H04L 63/107–63/108; H04L 63/306
See application file for complete search history.

(56) References Cited

U.S. PATENT DOCUMENTS

| | | |
|---|---|---|
| 6,486,907 B1 | 11/2002 | Farber et al. |
| 6,529,706 B1 | 3/2003 | Mitchell |
| 6,810,527 B1 | 10/2004 | Conrad et al. |
| 6,970,127 B2 | 11/2005 | Rakib |
| 7,415,243 B2 | 8/2008 | Yuhara et al. |
| 7,620,365 B2 | 11/2009 | Hoffmann et al. |
| 7,633,998 B2 | 12/2009 | Dockemeyer et al. |

(Continued)

*Primary Examiner* — Redentor Pasia
(74) *Attorney, Agent, or Firm* — Fogarty LLP

(57) ABSTRACT

A system for receiving satellite radio signals and/or internet content and extracting a plurality of channels from the satellite radio signals and/or internet content is disclosed. The content of the channels is converted to IP packets and streamed across an Ethernet network. In one embodiment, each of the channels is associated with an IP address or port. Users receive the content of the channels by selecting the IP address or port associated with the desired content. An administrator may control the channels that are available to the users. In one embodiment, the users each have a subscription to access the content, and the subscription may control the channels that the user access.

19 Claims, 4 Drawing Sheets

(56) References Cited

U.S. PATENT DOCUMENTS

| | | |
|---|---|---|
| 7,650,620 B2 | 1/2010 | Fish et al. |
| 7,853,341 B2 | 12/2010 | McCarty et al. |
| 2002/0006116 A1 | 1/2002 | Burkhart |
| 2004/0002987 A1* | 1/2004 | Clancy ............... H04N 5/44543 |
| 2004/0172652 A1 | 9/2004 | Fisk et al. |
| 2005/0086062 A1 | 4/2005 | Clark |
| 2005/0229228 A1* | 10/2005 | Relan .................... H04H 60/33 |
| | | 725/116 |
| 2006/0080707 A1 | 4/2006 | Laksono |
| 2006/0225102 A1 | 10/2006 | James et al. |
| 2007/0021053 A1 | 1/2007 | Marrah |
| 2007/0049192 A1 | 3/2007 | Hoffmann et al. |
| 2007/0202800 A1 | 8/2007 | Roberts et al. |
| 2008/0010482 A1 | 1/2008 | Tsang |
| 2009/0013359 A1* | 1/2009 | Butler ................... G06Q 30/06 |
| | | 725/105 |
| 2009/0025055 A1 | 1/2009 | White et al. |
| 2009/0222875 A1 | 9/2009 | Cheng et al. |
| 2009/0232077 A1* | 9/2009 | Krieger ................. H04H 40/90 |
| | | 370/329 |
| 2010/0251299 A1 | 9/2010 | Scott et al. |
| 2011/0086614 A1* | 4/2011 | Brisebois ................. H04K 3/42 |
| | | 455/411 |
| 2011/0317079 A1* | 12/2011 | McRae ............. H04N 21/4113 |
| | | 348/739 |

\* cited by examiner

DISTRIBUTION OF BROADCAST CONTENT TO CONTROLLED-ENVIRONMENT FACILITIES

CROSS-REFERENCE TO RELATED APPLICATIONS

This application is a continuation of U.S. patent application Ser. No. 13/253,101, filed Oct. 5, 2011, which claims the benefit of the filing date of U.S. Provisional Patent Application No. 61/472,187 which was filed Apr. 5, 2011, the disclosures of which are hereby incorporated by reference herein in their entirety.

TECHNICAL FIELD

Embodiments of the invention are directed, in general, to providing multichannel broadcast content to areas with limited or no reception and, more specifically, to providing satellite, streaming internet and the like to controlled-environment facilities.

BACKGROUND

Broadcasting services, such as SIRIUSXM™ radio, or internet broadcasting radio services such as PANDORA® or RHAPSODY® provide users with a broad array of content, including music, talk, news, and other entertainment and educational information. A limitation of such satellite radio broadcast services is that reception typically requires a clear view of the sky in order to receive the satellite signals. Reception of the satellite signals inside of buildings is often limited or impossible. In particular, reception inside buildings having large amounts of metal and concrete, such as jails, prisons, hospitals, or other controlled-environment facilities, further limit the direct reception of satellite signals. These facilities may include many iron bars, fences, and other security equipment in addition to reinforced concrete walls that effectively block most or all radio transmission. Broadcasting services do not have the ability to securely control and limit access to inmates in a controlled environment.

Even if such transmissions could be received in controlled-environment facilities, the staff in many facilities, such as jails and prisons, may not want residents of the facility to have unrestricted access to satellite or internet services. Accordingly, the staff in these facilities would likely desire to select certain content that could be received by the residents and to block or eliminate other undesirable content.

SUMMARY

Embodiments of the invention are directed to a system for receiving satellite or internet services and extracting a plurality of information channels from the satellite or internet services. The content of the information channels is converted to IP packets and streamed across an Ethernet network. In one embodiment, each of the information channels is associated with an IP address or port. Users receive the content of the information channels by selecting the IP address or port associated with the desired content.

In one embodiment, an Ethernet distribution receiver extracts channels from satellite radio signals. The Ethernet distribution receiver may include a plurality of multichannel receiver circuits. Each of the multichannel receiver circuits is adapted to extract a preselected number of channels from the satellite radio signals. A hub distributes channel data as IP data packets on an Ethernet network to one or more access points. The Ethernet distribution receiver and/or the hub may assign an address to each of the extracted channels. The access points provide the channel data to one or more media receivers via a wireless communication protocol. The media receivers include a Web browser that is adapted to select content from a desired channel by pointing the browser to the address of the desired channel. The wireless communication protocol used by the access points and media receivers may include, for example, a WiFi or IEEE 802.11 protocol, a WiMAX or IEEE 802.16 protocol, an Unlicensed Mobile Access (UMA) protocol, and Bluetooth protocol and/or other private carrier networks.

A satellite receiver may be coupled to the Ethernet distribution receiver and receive the satellite radio signals broadcast from a satellite. The channels may comprise entertainment, news and other content.

An administrative workstation may be coupled to the hub. The administrative workstation/control System may control user access to the channels. The media receivers may be assigned an identifier that is used to identify and control the channels that are provided to the media receivers. The administrative workstation/control system may also utilize information from other sources such as the jail or prison management system, billing system, or other systems.

In another embodiment, a demultiplexer receiver is adapted to extract channels from a multiplexed data signal. The demultiplexer receiver may include a plurality of multichannel receiver circuits. Each of the multichannel receiver circuits is adapted to extract a preselected number of channels from the satellite or internet signals. The demultiplexer receiver may assign an address to each of the extracted channels. The address may be an IP address or a port address. The multiplexed data signal may be received via a packet data network from a satellite broadcast content provider, from a multichannel music content provider, or from another source. A hub distributes the channels as IP data packets on an Ethernet network to one or more access points. The access points provide the channels to one or more media receivers via a wired or wireless communication protocol. The media receivers may include a browser that is adapted to select content from a desired channel by accessing the address of a desired channel. The media receivers may be assigned an identifier. The identifier may be used to determine which of the channels may be provided to the media receivers.

In another embodiment, a multiplexed data signal is received at a demultiplexer receiver. A plurality of channels are extracted from the multiplexed data signal. An address is assigned to each of the channels. Each of the channels is provided as data packets that are accessible at the address. The channel data packets are routed to a wireless access point, which transmits the channel data packets point to the media receiver. A browser in a media receiver is directed to the address for a selected channel. The media receiver receives data packets for the selected channel and provides content from the selected channel to a user. An identifier may be determined for the media receiver. A list of approved channels is associated with the identifier in a subscriber account.

BRIEF DESCRIPTION OF THE DRAWINGS

Figure 1:
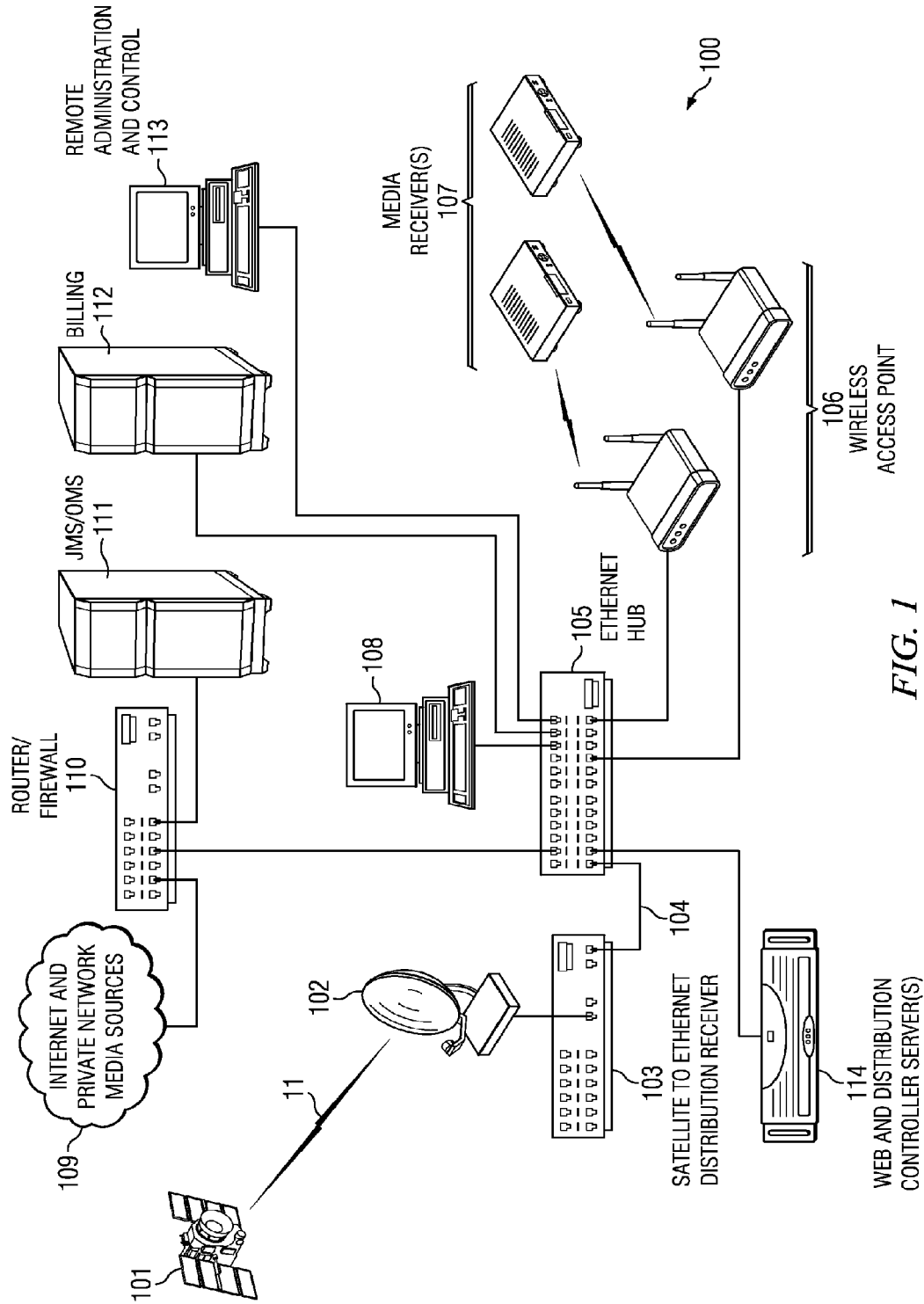
Figure 2:
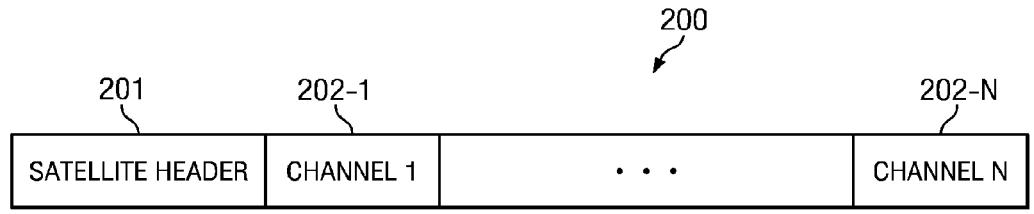
Figure 3:
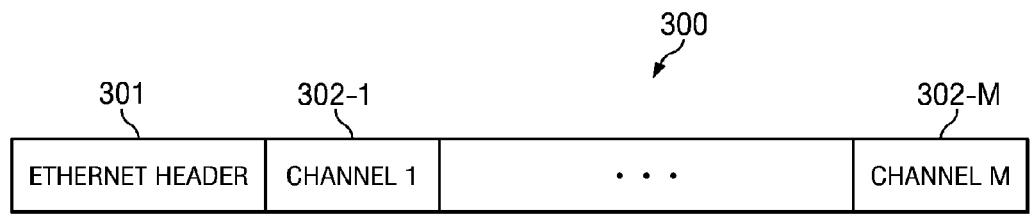
Figure 6:
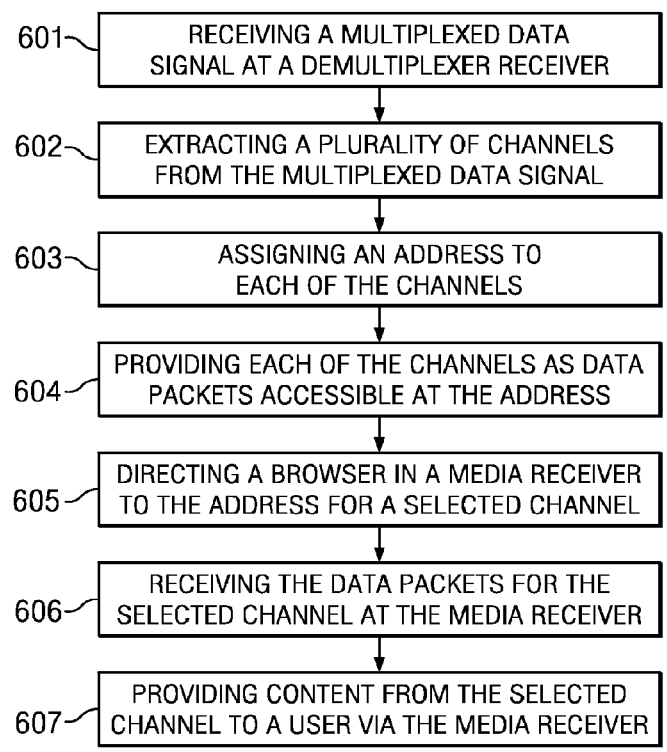
Figure 4:
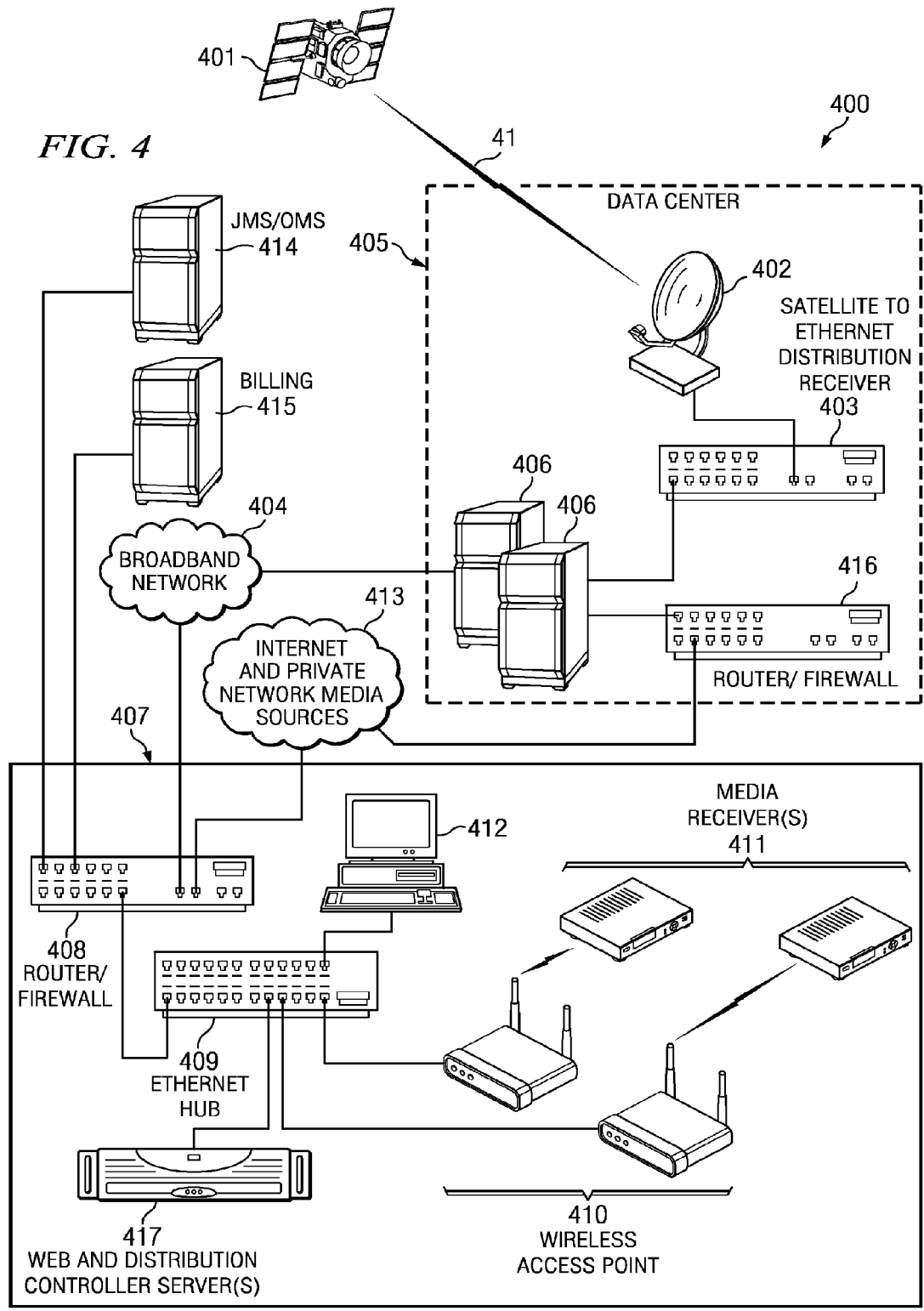
Figure 5:
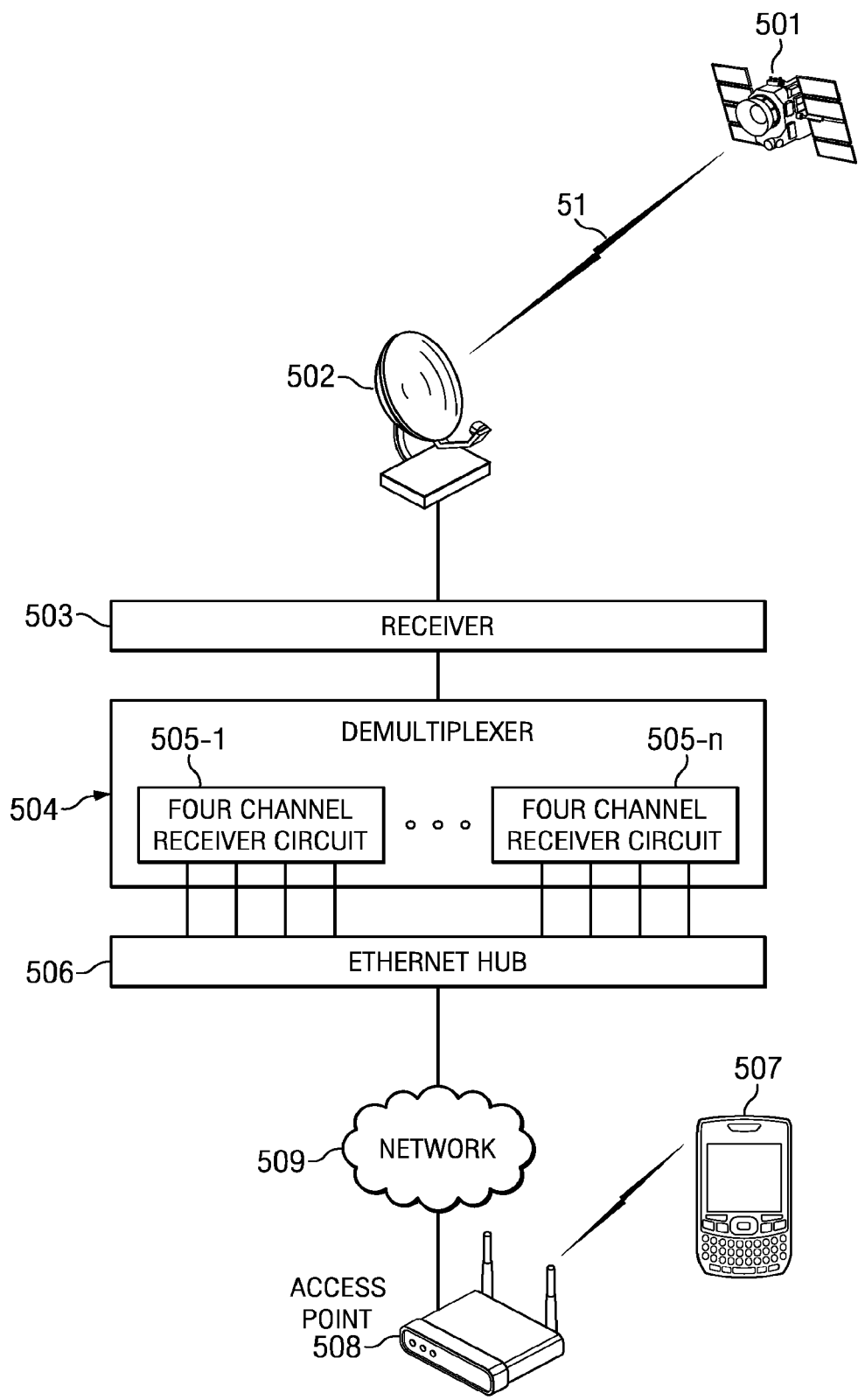

Having thus described the invention in general terms, reference will now be made to the accompanying drawings, which are not necessarily drawn to scale, and wherein:

FIG. 1 is a block diagram of a satellite and/or internet reception and distribution system according to one embodiment;

FIG. 2 illustrates a representative frame structure of signals received from a satellite transmitter;

FIG. 3 illustrates a representative frame structure of signals on a packet based network;

FIG. 4 is a block diagram of a satellite radio reception and distribution system according to an alternative embodiment;

FIG. 5 is a block diagram of an alternative embodiment of a satellite radio reception and distribution system 500; and FIG. 6 illustrates a process for providing audio and video content to users.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of a satellite radio reception and distribution system 100 according to one embodiment. Satellite 101 broadcasts signals 11 that are received by ground-based antenna 102. Satellite 101 may be operated by a satellite radio provider, such as Sirius XM Radio Inc., which provides SIRIUSXM™ radio broadcasting services. The signals 11 carry data representing the content of a plurality of entertainment and information channels. For purposes of the examples described herein, the channels carried on signals 11 may be referred to as "radio channels;" however, it will be understood that these signals may also carry audio, video and/or other content for music, talk, news, sports, and other types of channels. The SIRIUSXM™ services are well known and are often used by subscribers having a satellite receiver incorporated in a car radio or another fixed or portable device. Typically, subscribers select a desired channel and that channel is directly received and processed by the satellite receiver, which then plays the selected channel's content for the subscriber.

The data in radio signals 11 is organized and carried in frames, such as frame 200 (FIG. 2). It will be understood that frame 200 is highly simplified and is for purposes of illustration only. Frame 200 is not intended to represent the actual frame structure of a SIRIUSXM™ satellite transmission. Frame 200 includes a satellite transmission header 201 and a number of channel slots 202. Header 201 includes timing, identification, authentication, and/or other data as required for receiver 102 to identify and process frames 200. Channel slots 202 each carry data that is specific to a particular satellite radio channel. A dedicated channel slot 202 is assigned to each radio channel. The number N of channel slots is selected based upon the number of satellite radio channels available to subscribers. While some of the content channels are available to subscribers, some channels may require an extra fee to use (e.g. premium or pay channels).

The amount of data in each channel slot 202 varies depending upon the type of content carried on each channel. For example, a music channel may have an average channel bit rate of 64 kbps, talk, news and sports channels may have an average channel bit rate of 32 kbps, and data, traffic and programming channels may have an average channel bit rate of 4-8 kbps. In another example web content would have a variable bit rate. In one embodiment, a satellite radio system having 120-150 channels of various types would have a total bit rate of approximately 6-7 Mbps. The actual number of bytes in channel slots 202 would be selected based upon the channel bit rate for each respective channel type and the overall selected frame size. Header 201 typically has the same size and format in each frame. Header 201 may include information indicating the number of channel slots 202 and/or the location and size of each slot 202.

Antenna 102 receives satellite signals 11 and passes them to satellite to Ethernet distribution receiver 103. Receiver 103 demodulates, demultiplexes, decodes, or similarly processes the received signals 11 as necessary to extract frames 200. Receiver 103 then reformats frames 200, as necessary, and adapts the received data for transmission on Ethernet network 104. In one embodiment, receiver 103 separates out each channel from the satellite signals 11 and streams the channels over Ethernet transport. Although an Ethernet network is used in the illustrated example, it will be understood that any packet-based data network may be used to carry data from receiver 103 to other network nodes.

FIG. 3 illustrates frame 300, which carries the received and decoded content data on Ethernet 104 in one embodiment. Frame 300 includes Ethernet header 301, which may replace satellite header 201 or may include some or all of the data from satellite header 201. Ethernet header 301 is used to route frame 300 to other devices, such as hub 105. Channel slots 302 carry the radio channel data received in channel slots 202 of satellite signals 11. The number M of channel slots 302 may be the same as the number of channel slots 202 (i.e. M=N). Alternatively, frame 300 may not carry all of the original channels 202 available on received satellite signal 11 (i.e. M<N). For example, receiver 103 may drop or block pay or premium channels or certain channels having only limited or localized interest, such as traffic or weather information for other locations.

Frames 300 are routed from hub 105 to one or more wireless access points 106, which broadcast the frames to media receivers 107. Wireless access points 106 may communicate with media receivers 107 using WiFi (IEEE 802.11), WiMAX (IEEE 802.16), Unlicensed Mobile Access (UMA), Bluetooth or any other protocol, standard, or technology that is capable of carrying frames 300 or similar data that has been routed from distribution receiver 103. Media receivers 107 may be any hand-held, portable, fixed or mobile device that is capable of establishing a wired or wireless connection to, and exchanging data packets with, wired end point media devices and/or wireless access points 106, such as a notebook or laptop computer, mobile telephone, personal digital assistant (PDA), handheld computing device, music and/or video player, or the like.

Frames 300 may also be routed from hub 105 to one or more workstations 108, which may be used to control the operation of the system. Workstation 108 may also be used to listen to or watch the content of the channels 302 carried in frames 300. In one embodiment, a supervisor or operator may use workstation 108 to configure how receiver 103 and/or hub 105 route frames 300. Alternatively, workstation 108 may be used to configure which content from channel slots 202 is carried in channel slots 302 and, therefore, may be available to media receivers 107. Workstation 108 may also control which channels are transmitted by wireless access points 106 and which channels media receivers 107 may access Workstation 108 may be located inside or outside the facility or in a centralized location.

Workstation 108 may receive information from a billing system 112 and/or a JMS (Jail Management System) or OMS (Offender Management System) 111 or any other system to determine inmate access to streaming content. The JMS/OMS 111 and/or billing system 112 may be located on-premise or remote from the facility. A router/firewall 110 may couple the system to the Internet or to a private network or other media sources 109.

The elements of system 100—other than satellite 101—may be located in a single facility. Antenna 102 may be a roof-top antenna located at the facility, and receiver 103, hub 105 and workstation 108 may be located in the same or different locations of the facility. In other embodiments, components, such as hub 105 and receiver 103, may be combined into a single device. Wireless access points 106 may be distributed throughout the facility. The number of wireless access points 106 is selected based upon the size of the area to be covered, the number of users, and/or the wireless coverage capabilities of the access points 106. Alternatively, system 100 may be distributed among two or more locations or buildings.

A remote administration and control workstation 113 may be used in addition to or alternatively to workstation 108.

Dedicated web and distribution controller server(s) 114 may be used to control distribution of content. In one embodiment, web and distribution controller server(s) 114 is an on-site device that ties together content from multiple sources for distribution to the user device 107.

FIG. 4 is a block diagram of an alternative satellite radio reception and distribution system 400 according to another embodiment. Satellite 401 broadcasts signals 41, which are received by ground-based antenna 402. Satellite 401 and signals 41 may be similar to satellite 101 and signals 11 (FIG. 1) and thereby provide the content of a plurality of entertainment and information channels. The data in radio signals 41 may be organized and carried in frames, such as frame 200 (FIG. 2) as described above.

Antenna 402 receives satellite signals 41 and passes them to satellite to Ethernet distribution receiver 403. Receiver 403 demodulates, demultiplexes, decodes or similarly processes the received signals 41 as necessary to extract frames 200. Receiver 403 then reformats frames 200, as necessary, and adapts the received data for transmission on broadband network 404 as frames 300 (FIG. 3). Antenna 402 and distribution receiver 403 are located in one or more central data center(s) 405. Servers 406 in one or more data centers 405 provide services, such as messaging, data storage, web hosting, or the like, to one or more remote facilities 407 and/or remote users.

The remote facilities and users access data center(s) 405 via broadband network 404, which may be, for example, any wireless or wired communication network, such as packet-based network including the Internet, local area network (LAN), metropolitan area network (MAN), wide area network (WAN), or any other communications network.

Servers 406 route frames 300 to facility 407. Router/firewall 408 controls the flow of data packets, including frames 300, received from broadband network 404 and data center 405. Router/firewall 408 routes the received frames 300 to Ethernet hub 409 for further distribution within facility 407. Frames 300 are routed from hub 105 to one or more wireless access points 410, which broadcast the frames to media receivers 411. Wired or wireless access points 410 may communicate with media receivers 411 using WiFi (IEEE 802.11), WiMAX (IEEE 802.16), Unlicensed Mobile Access (UMA), Bluetooth or any other protocol, standard, or technology that is capable of carrying frames 300 or similar data that has been routed from distribution receiver 403 and data center(s) 405. Media receivers 411 may be any hand-held, portable, fixed or mobile device that is capable of establishing a wireless connection to, and exchanging data packets with, wireless access points 410, such as a notebook or laptop computer, mobile telephone, personal digital assistant (PDA), or the like. Router/firewall 408 may couple the system at facility 407 to the Internet or to a private network or other media sources 413. Additionally, or alternatively, router/firewall 416 may couple data center 405 to the Internet or to a private network or other media sources 413. Content from the Internet or private network or other media sources 413 may be distributed either via data center 405 or directly at facility 407.

Frames 300 may also be routed from hub 409 to one or more workstations 412, which may be used to control the distribution of frames 300 within facility 407. Workstation 412 may also be used to listen to or watch the content of the channels 302 carried in frames 300. In one embodiment, a supervisor or operator may use workstation 412 to configure how router/firewall 408 and/or hub 409 route frames 300. Alternatively, workstation 412 may be used to configure which content from channel slots 202 is carried in channel slots 302 and, therefore, may be available to media receivers 411. Workstation 412 may also control which channels are transmitted by wireless access points 410 and which channels media receivers 411 may access. Workstation 412 may be located inside or outside the facility or in a centralized location. Workstation 412 may receive information from a billing system 415 and/or from a JMS/OMS system 414 or any other system to determine inmate access to streaming content.

Workstations 108, 412 may be administrative workstations that control which channels (302) are available to each media receiver 107, 411. The media receivers may require registration by the administration workstation in order to operate on the system and to access the channel content. Access to the content may require a subscription or other account or payment prior to operation. The administrative workstation may be used to process such accounts and payments.

In one embodiment, the media receivers 107, 411 are assigned a serial number or other identifier that is accessible to the administrative workstations. The serial number or other identifier may be used to identify a subscriber or user account that identifies which, if any, channels are available to the media receiver. The list of available channels may be determined, for example, based upon a user's subscription plan or a list of approved channels by a facility manager, such as a warden or sheriff. In other embodiments, the media receiver serial number or identifier may itself indicate what channels are allowed to be received by the media receiver. Such a system would prevent or minimize user-tampering by limiting certain devices to specific channels using a predefined and inaccessible serial number or other identifier.

The administrative workstation may be used to control the operation of wireless access points 106, 410. A network operator or facility service provider may select to have all, some or none of the wireless access points operational at any time. For example, certain wireless access points may operate at all times to provide content to users in one part of the facility, while other wireless access points are only operated at certain times to limit other users' access to the content. Additionally, the administrative workstation may control which channels are available at each wireless access point, thereby allowing particularized control in different parts of the facility.

Dedicated web and distribution controller server(s) 417 may be used to control distribution of content. In one embodiment, web and distribution controller server(s) 417 is an on-site device that ties together content from multiple sources for distribution to the user device 410. For example, web and distribution controller server(s) 417 may provide local web pages to device 410 that allow the device to search or review content. Web and distribution controller server(s) 417 may also provide web pages for streaming media content. The number of web and distribution controller server(s) 417 required may be determined based upon the number of users 410, for example. Additionally, web and distribution controller server(s) 417 may be combined with receiver 403.

The facility may be a correctional facility or other controlled-environment facility, such as a retirement center, a school, a hotel, an orphanage, a managed care facility, a mental health facility, or a hospital. The users may be the residents, guests, patients, employees, staff, and/or inmates of the facility.

In the case of a correctional facility, inmates may use media receivers 107 to access content that is otherwise not available via direct satellite reception due blocking and attenuation of the signals by the correctional facility's structure. Additionally, in the system described herein, the facility may control the content that is available to the inmates via the media receivers. The administrative workstation may be used to control which channels and what types of content are allowed for each inmate. Each media receiver may be assigned to a particular inmate and configured to receive or access a predetermined group of channels. Alternatively, instead of tracking each media receiver—which may be exchanged, sold, traded or Stolen—the inmate may be required to log-in to the media receiver for each use. The log-in information would associate the media receiver with a particular inmate's account for that use, such as for a predetermined period. During that use, the content available on the media receiver would be determined by the content assigned to the logged-in inmate.

In one embodiment, the satellite distribution receiver 103, 403 assigns a unique IP address, URL, and/or port to each channel 302. The media receivers access the content on the various channels by connecting to the assigned IP address, URL or port for a desired channel. Each media receiver and/or inmate may have an approved list of IP addresses, URLs, and/or ports that they are allowed to access. If the inmate attempts to access an unapproved channel, the media receiver, Ethernet hub and/or distribution receiver will reject the attempted connection and will not allow the content to pass to the inmate. Further, this information can be logged for investigative purposes.

In the case of satellite radio, other information can be provided on each channel or at each IP address, URL or port in addition to the satellite radio content. For example, the Ethernet hub, distribution receiver, or data center servers may add video content to the audio content received from the satellite. The media receiver may use a browser application to access the IP address, URL or port for a desired channel. The system may then provide both the desired audio content plus added video content to the media receiver. The additional content may be provided to all the inmates or may be targeted to each media receiver based upon the selected channel, active inmate account, media receiver IP address or MAC address, end point capabilities or other factor.

The media receiver device may be capable of transmitting or uploading information to the system, such as log-in or registration information, emails, comments, or other data. The administrative workstation may also control the user's capabilities for uploading information to prevent the transmission of illegal, unauthorized, or malicious data.

The radio channel content, such as voice or music data, may be compressed at a source location, such as a satellite radio broadcasting center, before up-linking the content to the satellite. The channel content data in channel slots 202 and 302 may also be compressed in this manner. The media receiver may have a decompression or decoding chip set, ASIC or processor that recovers the original content from the compressed channel data. In this way, the bandwidth required in the facility network and over the air interface between the media receiver and the wireless access point may be reduced.

FIG. 5 is a block diagram of an alternative embodiment of a satellite radio reception and distribution system 500. Satellite 501 broadcasts microwave signals 51 carrying audio, video and/or other content for music, talk, news, sports, and other entertainment or educational radio channels. Satellite receiver 502 receives microwave signals 51 and down-converts the microwave signals to baseband signals that are provided to receiver 503. The receiver 503 separates out all or some of the channels embedded in microwaves signals 51 and provides them to demultiplexer 504. In one embodiment, baseband receiver includes one or more four-channel receiver circuits 505.

Each of the four-channel receiver circuits 505-1 to 505-$n$ is adapted to extract four selected channels from the stream of baseband signals received from receiver 503. Demultiplexer 504 may comprise one four-channel receiver 505-1, which would allow the system to extract four selected channels from the satellite signals 51. Alternatively, demultiplexer 504 may comprise a plurality of four-channel receivers 505-1 to 505-$n$, which would allow the system to extract up to 4×n channels from the satellite signals 51. For example, if the satellite signals included 137 channels, then thirty-five (n=35) four-channel receiver circuits 505 would be required to extract all 137 channels. The thirty-five four-channel receiver circuits 505 would be capable of extracting up to 140 channels from the satellite signals.

Although demultiplexer 504 in FIG. 5 uses four-channel receiver circuits 505, it will be understood that the receiver circuits 505 may be configured to receive and extract any other number of channels in each circuit 505. Receiver circuits 505 may be a digital signal processor (DSP) and/or a microprocessor, for example, that is adapted to extract one or more channels from a baseband signal.

A user having a media receiver 507 or other wireless device may access the channels available at Ethernet hub 506 via an access point 508 and IP network 509. Media receiver 507 and access point 508 may communicate via any wireless communication protocol, such as WiFi (IEEE 802.11), WiMAX (IEEE 802.16), Unlicensed Mobile Access (UMA), Bluetooth or any other protocol, standard, or technology. Media receiver 507 may include a Web browser or other application for accessing Web pages and other content, such as streaming audio and video data. Media receiver 507 may access one or more of the radio channels extracted at demultiplexer 504 by pointing the Web browser to the IP address or port associated with a channel of interest. The information associated with that channel, such as audio or video data, is streamed as IP packets though network 509 and access point 508 to media receiver 507 where it is played or displayed to the user.

Although SIRIUSXM™ is used as an example herein, it will be understood by those of ordinary skill in the art that information from any other multichannel radio, audio, or video streaming source, such as the PANDORA® service or RHAPSODY® service may be distributed and accessed in a similar manner. For example, private networks and other media sources 109, 413 may be a PANDORA®, RHAPSODY®, SIRIUSXM™ or other content provider.

The channel content may be pre-recorded and/or live information. The channel content may also contain buffered "live" information that is delayed for a predetermined period to allow screening of the content for unauthorized, unacceptable, harmful, or other objectionable material. Additionally, the content of the channels may be preselected information and/or may be information that is available "on-demand" when requested by a user.

FIG. 6 illustrates a process for providing audio and video content to users. In step 601, a multiplexed data signal is received at a demultiplexer receiver. The multiplexed data signal may be received, for example, from a satellite via radio signals or from a content provider via an Internet or data link connection. In step 602, a plurality of channels are extracted from the multiplexed data signal. The channels may comprise audio and/or video content, such as entertainment, music, talk, or other information. In step 603, an address is assigned to each of the channels. The address may be an IP address or a port address, for example. In step 604, each of the channels is provided as data packets that are accessible at the assigned address.

In step 605, a media receiver directs a browser application to the address assigned to a selected channel. In step 606, the data packets for the selected channel are received at the media receiver. The data packets may be transmitted via a wired or wireless connection between the media receiver and an access point or other wired or wireless base station. In step 607, the content for the selected channel is provided to a user on the media receiver. For example, the content may be audio information that is played via speakers or headphones and/or video information that is shown on a display.

It will be understood that the steps illustrated in the process illustrated in FIG. 6 may be performed in the order shown or in any other order. Additionally, the steps may be performed sequentially or simultaneously.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

The invention claimed is:

1. A system, comprising:
a processor; and
a memory coupled to the processor, the memory having program instructions stored thereon that, upon execution by the processor, cause the system to:
receive a plurality of channels extracted from satellite radio signals by a satellite receiver/multiplexer and distributed across an incarceration facility by a hub as IP data packets on an Ethernet network;
control particular media content available to a given one of a plurality inmates incarcerated within the incarceration facility by:
(a) selecting one or more of the plurality of channels available to the given inmate based upon the given inmate's records stored in a Jail Management System (JMS) or Offender Management System (OMS),
(b) looking up the particular media content available to a media receiver of the given inmate based upon an identification of the given inmate's media receiver,
(c) operating a first set of access points disposed in a first area of the incarceration facility and turning off a second set of access points during a first time period, and
(d) operating the second set of access points and turning off the first set of access points during a second time period;
select a subset of the one or more of the plurality of channels that the given inmate is allowed to access based, at least in part, on selection of the one or more channels available to the given inmate and the particular media content available to a media receiver of the given inmate; and
provide the selected subset of one or more channels to the given inmate's media receiver via one or more access points by operating the first set of access points during the first time period and operating the second set of access points during the second time period.

2. The system of claim 1, wherein the channels comprise at least entertainment and news content.

3. The system of claim 1, wherein the hub is configured to assign an address to each of the channels.

4. The system of claim 3, wherein the address is an IP address or a port address.

5. The system of claim 3, wherein the media receiver is configured to execute a web browser adapted to select content from a desired one of the one or more of the plurality of channels by pointing the web browser to the address of the desired channel.

6. The system of claim 1, wherein the hub comprises a plurality of multichannel receiver circuits, each of the multichannel receiver circuits adapted to extract a preselected number of channels from the satellite radio signals.

7. The system of claim 1, wherein the one or more access points is configured to implement a wireless communication protocol selected from the group consisting of: a WiFi or IEEE 802.11 protocol; a WiMAX or IEEE 802.16 protocol; an Unlicensed Mobile Access (UMA) protocol; and a Bluetooth protocol.

8. The system of claim 1, wherein the media receiver is configured to receive the one or more of the plurality of channels via a wired connection.

9. A system, comprising:
   a processor; and
   a memory coupled to the processor, the memory having program instructions stored thereon that, upon execution by the processor, cause the system to:
      receive a plurality of channels extracted from satellite radio signals by a satellite receiver/multiplexer and distributed across an incarceration facility by a hub as IP data packets on an Ethernet network;
      control particular media content available to a given one of a plurality inmates incarcerated within the incarceration facility by selecting one or more of the plurality of channels available to the given inmate based upon a subscription plan associated with the inmate;
      select a subset of the one or more of the plurality of channels that the given inmate is allowed to access;
      provide the selected subset of one or more channels to the given inmate's media receiver via a plurality of access points by operating at least one access point disposed in a first area of the incarceration facility during a first time period and operating at least one access points disposed in a second area of the incarceration facility during a second time period; and
      in response to the given inmate attempting to access an unauthorized channel that is not part of the subset of the one or more available to the given inmate that the given inmate is allowed to access, creating a log of the given inmate's attempt.

10. The system of claim 9, wherein at least one of the one or more of the plurality of channels is a premium channel that requires an extra fee.

11. The system of claim 9, wherein the program instructions, upon execution, further cause the system to provide the log to an investigator.

12. The system of claim 9, wherein an address is assigned to each of the extracted channels and wherein the media receiver comprises a Web browser adapted to select content from a desired channel by pointing the Web browser to the address of a desired channel via local or remote control.

13. The system of claim 12, wherein the address is an IP address or a port address.

14. The system of claim 9, wherein the program instructions, upon execution by the processor, further cause the system to bill the given one of the plurality of inmates for access to media content.

15. A memory device having program instructions stored thereon that, upon execution by a processor of a computer system, causes the computer system to:
    receive a plurality of channels extracted from satellite radio signals by a satellite receiver/multiplexer and distributed across an incarceration facility by a hub as IP data packets on an Ethernet network;
    control particular media content available to a given one of a plurality inmates incarcerated within the incarceration facility by operating a first set of access points disposed in a first area of the incarceration facility and turning off a second set of access points in a second area of the incarceration facility during a first time period, and operating the second set of access points and turning off the first set of access points during a second time period;
    select a subset of the one or more of the plurality of channels that the given inmate is allowed to access; and
    provide the selected subset of one or more channels to the given inmate's media receiver via one or more access points by operating the first set of access points during the first time and operating the second set of access points during the second time period.

16. The memory device of claim 15, wherein the program instructions, upon execution by the processor, further cause the computer system to:
    in response to the given inmate directing a browser in the given inmate's media receiver to the address for a selected channel, receive the data packets for the selected channel at the media receiver; and
    provide content from the selected channel to the given one of the plurality of inmates via the media receiver.

17. The memory device of claim 15, wherein the program instructions, upon execution by the processor, further cause the computer system to:
    route the channel data packets to a wired and/or wireless access point; and
    transmit the channel data packets from the wired and/or wireless access point to the given inmate's media receiver.

18. The memory device of claim 15, wherein the program instructions, upon execution by the processor, further cause the computer system to:
    determine an identifier for the given inmate's media receiver; and
    determine a list of approved channels associated with the identifier.

19. The memory device of claim 18, wherein the list of approved channels and the identifier are associated with the given inmate.

* * * * *